United States Patent
Wang et al.

(10) Patent No.: US 12,505,881 B2
(45) Date of Patent: Dec. 23, 2025

(54) SEMICONDUCTOR DEVICE, PROGRAMMING METHOD, MEMORY, MEMORY SYSTEM AND ELECTRONIC DEVICE

(71) Applicant: Yangtze Memory Technologies Co., Ltd., Hubei (CN)

(72) Inventors: Yan Wang, Wuhan Hubei (CN); Chunyuan Hou, Wuhan Hubei (CN); Masao Kuriyama, Wuhan Hubei (CN); Zhichao Du, Wuhan Hubei (CN); Lichuan Zhao, Wuhan Hubei (CN)

(73) Assignee: Yangtze Memory Technologies Co., Ltd., Wuhan (CN)

( * ) Notice: Subject to any disclaimer, the term of this patent is extended or adjusted under 35 U.S.C. 154(b) by 214 days.

(21) Appl. No.: 18/090,961

(22) Filed: Dec. 29, 2022

(65) Prior Publication Data
US 2024/0005993 A1   Jan. 4, 2024

(30) Foreign Application Priority Data
Jul. 1, 2022 (CN) .......................... 202210775689.X (51) Int. Cl.
*G11C 16/10* (2006.01)
*G11C 16/08* (2006.01)
*G11C 16/24* (2006.01)

(52) U.S. Cl.
CPC .............. *G11C 16/10* (2013.01); *G11C 16/08* (2013.01); *G11C 16/24* (2013.01)

(58) Field of Classification Search
CPC ......... G11C 16/10; G11C 16/08; G11C 16/24; G11C 16/0483
See application file for complete search history.

(56) References Cited

U.S. PATENT DOCUMENTS

| | | | |
|---|---|---|---|
| 2006/0034121 A1* | 2/2006 | Khalid | G11C 16/0483 365/185.19 |
| 2007/0070744 A1* | 3/2007 | Chen | G11C 7/12 365/203 |
| 2017/0330628 A1* | 11/2017 | Oh | G11C 16/24 |
| 2018/0033798 A1* | 2/2018 | Baraskar | H01L 23/528 |
| 2022/0028440 A1* | 1/2022 | Tang | H10B 43/35 |
| 2022/0059157 A1* | 2/2022 | Cui | G11C 11/4085 |

* cited by examiner

*Primary Examiner* — Amir Zarabian
*Assistant Examiner* — Bradley S Coon
(74) *Attorney, Agent, or Firm* — Oblon, McClelland, Maier & Neustadt, L.L.P.

(57) ABSTRACT

A semiconductor device includes a plurality of bit line units, a word line unit, a bit line drive unit, and a word line drive unit. The word line unit comprises a plurality of word line stacked in a first direction, and a first and a second word line units in a second direction. A distance between the second word line unit and the word line drive unit is greater than a distance between the first word line unit and the word line drive unit. The word line drive unit provides the word line unit with a driving voltage for programming. The bit line drive unit applies a first bias voltage to a bit line unit corresponding to the first word line unit during a charging phase of programming, and a second bias voltage to a bit line unit corresponding to the second word line unit during a discharging phase.

13 Claims, 4 Drawing Sheets

SEMICONDUCTOR DEVICE, PROGRAMMING METHOD, MEMORY, MEMORY SYSTEM AND ELECTRONIC DEVICE

CROSS REFERENCE OF RELATED APPLICATIONS

The present application claims the benefit of priority to China Application No. 202210775689.X, "Semiconductor device, programming method, memory, memory system and electronic device", file on Jul. 1, 2022, the content of which is incorporated herein by reference in its entirety.

TECHNICAL FIELD

The present disclosure relates to field of semiconductor technologies, and in particular to a semiconductor device, a programming method, a memory, a memory system, and an electronic device.

BACKGROUND

A word line of a conventional three-dimensional memory is driven at one end, and signals on the word line are transmitted from one end to the other end. However, in the case of the three-dimensional memory in which the word lines are also three-dimensionally distributed, the lengths of access paths through the individual word lines are different, thereby leading to delay in signal loading. In order to address the problem of signal loading delay, a word line drive unit of the three-dimensional memory is generally arranged in the middle part of a storage area, so as to reduce the difference between the lengths of the access paths through the individual word lines.

Nevertheless, as the number of stacked layers of the three-dimensional memory increases, the difference between the lengths of the access paths through the individual word lines is accordingly increased, and thus the problem of signal loading delay still exists.

SUMMARY

Implementations of the present disclosure are intended to provide a semiconductor device, a programming method, a memory, a memory system, and an electronic device.

The technical scheme of the present disclosure is implemented as follows.

A first aspect of the implementation of the present disclosure provides a semiconductor device, and the semiconductor device can include:
  a bit line unit, a word line unit, a bit line drive unit and a word line drive unit; wherein,
  the bit line unit is configured to divide the word line unit into a first word line unit and a second word line unit; a distance between the second word line unit and the word line drive unit is greater than that a distance between the first word line unit and the word line drive unit;
  the word line drive unit is configured to provide the word line unit with a driving voltage for programming; and
  the bit line drive unit is configured to apply a first bias voltage to the bit line unit that performs the dividing to obtain the first word line unit in a charging phase of programming, and to apply a second bias voltage to the bit line unit that performs the dividing to obtain the second word line unit in a discharging phase of programming.

In one implementation of the present disclosure, the bit line unit is further configured to divide the first word line unit into a first word line subunit and a second word line subunit; and a distance between the second word line subunit and the word line drive unit is greater than a distance between the first word line subunit and the word line drive unit.

In one implementation of the present disclosure, the bit line unit is further configured to divide the second word line unit into a third word line subunit and a fourth word line subunit; and a distance between the fourth word line subunit and the word line drive unit is greater than a distance between the third word line subunit and the word line drive unit.

In one implementation of the present disclosure, the distance between the third word line subunit and the word line drive unit is greater than the distance between the first word line subunit and the word line drive unit, and is less than the distance between the second word line subunit and the word line drive unit.

In one implementation of the present disclosure, resistances of the first word line subunit, the second word line subunit, the third word line subunit, and the fourth word line subunit are equal.

In one implementation of the present disclosure, the bit line drive unit is specifically configured to apply the first bias voltage to the bit line unit that performs the dividing to obtain the first word line subunit, the second word line subunit and the third word line subunit in the charging phase of programming, and to apply the second bias voltage to the bit line unit that performs the dividing to obtain the fourth word line subunit, the third word line subunit and the second word line subunit in a discharging phase of programming.

In one implementation of the present disclosure, the word line unit includes a plurality of word line unit groups, each of the word line unit groups includes a plurality of layers of word lines, and a difference between values of the resistances of any two layers of word lines of each of the plurality of word line unit groups does not exceed a preset threshold.

In one implementation of the present disclosure, the bit line unit is configured to divide each of the plurality of word line unit groups into a first word line group and a second word line group; and the first word line groups of the plurality of word line unit groups constitute the first word line unit, and the second word line groups of the plurality of word line unit groups constitute the second word line unit.

In one implementation of the present disclosure, a magnitude of the first bias voltage is positively correlated with a difference between the distance from the second word line unit to the word line drive unit and the distance from the first word line unit to the word line drive unit.

In one implementation of the present disclosure, a magnitude of the second bias voltage is positively correlated with a difference between the distance from the second word line unit to the word line drive unit and the distance from the first word line unit to the word line drive unit.

In one implementation of the present disclosure, the word line drive unit includes a plurality of word line drive subunits, and each of the plurality of word line drive subunits corresponds to a layer of word lines for providing the driving voltage for programming to the corresponding word line.

In one implementation of the present disclosure, the semiconductor device further includes: a plurality of metal bridges; each metal bridge corresponding to a layer of word lines.

In one implementation of the present disclosure, each of the plurality of word line drive subunits is electrically connected to the second word line unit via a corresponding one of the plurality of metal bridges.

A second aspect of the implementation of the present disclosure provides a programming method, which can include:

providing a drive voltage for programming to a word line unit by a word line drive unit; wherein the word line unit includes a first word line unit and a second word line unit, and the first word line unit and the second word line unit are divided by a bit line unit, and a distance between the second word line unit and the word line drive unit is greater than a distance between the first word line unit and the word line drive unit;

applying a first bias voltage to the bit line unit that performs the dividing to obtain the first word line unit by a bit line drive unit in a charging phase of programming; and applying a second bias voltage to the bit line unit that performs the dividing to obtain the second word line units by the bit line drive unit in a discharging phase of programming.

In one implementation of the present disclosure, the first word line unit includes a first word line subunit and a second word line subunit; and a distance between the second word line subunit and the word line drive unit is greater than a distance between the first word line subunit and the word line drive unit.

In one implementation of the present disclosure, the second word line unit includes a third word line subunit and a fourth word line subunit; and a distance between the fourth word line subunit and the word line drive unit is greater than a distance between the third word line subunit and the word line drive unit.

In one implementation of the present disclosure, the distance between the third word line subunit and the word line drive unit is greater than the distance between the first word line subunit and the word line drive unit, and is less than the distance between the second word line subunit and the word line drive unit.

In one implementation of the present disclosure, the applying the first bias voltage to the bit line unit that performs the dividing to obtain the first word line unit by the bit line drive unit in the charging phase of programming, including: applying the first bias voltage to the bit line unit that performs dividing to obtain the first word line subunit, the second word line subunit and the third word line subunit by the bit line drive unit in the charging phase of programming.

In one implementation of the present disclosure, applying the second bias voltage to the bit line unit that performs the dividing to obtain the second word line units by the bit line drive unit in the discharging phase of programming, including: applying the second bias voltage to the bit line unit that performs dividing to obtain the fourth word line subunit, the third word line subunit and the second word line subunit by the bit line drive unit in the discharging phase of programming.

In one implementation of the present disclosure, the word line drive unit includes a plurality of word line drive subunits, and each of the plurality of word line drive subunits corresponds to a layer of word lines; the providing the drive voltage for programming to the word line unit by the word line drive unit including:

providing the driving voltage for programming to the word lines of different layers based on the plurality of word line drive subunits.

A third aspect of the implementation of the present disclosure provides a memory, which can include a memory unit and the semiconductor device according to the first aspect, wherein the semiconductor device is configured to control the memory unit for data storage based on a command, an address, or a control signal received from outside.

A fourth aspect of the implementations of the present disclosure provides a memory system, which can include a controller and the memory according to the third aspect; the controller is coupled to the memory and configured to control the memory to store data.

A fifth aspect of the implementations of the present disclosure provides an electronic device, which can include the memory according to the third aspect.

In one implementation of the present disclosure, the electronic device includes at least one of the following: a mobile phone, a desktop computer, a tablet computer, a notebook computer, a server, a vehicle-mounted device, a wearable device, and a mobile power supply.

A semiconductor device, a programming method, a memory, a memory system, and an electronic device are disclosed in the present disclosure. The semiconductor device includes: a bit line unit, a word line unit, a bit line drive unit, and a word line drive unit, where the bit line unit is configured to divide the word line unit into a first word line unit and a second word line unit; the distance between the second word line unit and the word line drive unit is greater than the distance between the first word line unit and the word line drive unit; the word line drive unit is configured to provide the driving voltage for programming to the word line unit; the bit line drive unit is configured to apply the first bias voltage to the bit line unit that performs the dividing to obtain the first word line unit in the charging phase of programming, and to apply the second bias voltage to the bit line unit that performs the dividing to obtain the second word line unit in the discharging phase of programming. In the semiconductor device and the programming method according to the present disclosure, by providing the bit line drive unit, the first bias voltage is applied to the bit line unit that performs the dividing to obtain a proximal word line subunit (the first word line unit) in the charging phase, and the second bias voltage is applied to the bit line unit that performs the dividing to obtain a distal word line subunit (the second word line unit) in the discharging phase, so as to delay the time for the proximal word line subunit to reach a working voltage in the charging phase and shorten the discharge time of the distal word line subunit in the discharging phase. The programming time gap between the proximal word line subunit and the distal word line subunit is reduced, so that the programming performance degradation caused by the programming time deviation between the word lines during the storage operation is minimized, and the programming performance of the programming device is improved.

BRIEF DESCRIPTION OF THE DRAWINGS

Various exemplary implementations of this disclosure that are proposed as examples will be described in detail with reference to the following figures, wherein like numerals reference like elements, and wherein.

DETAILED DESCRIPTION

The technical solutions in the implementations of the disclosure will be described clearly and completely below with reference to the drawings in the implementations of the disclosure. It is apparent that the described implementations are merely some of the implementations of the disclosure, but not all of them. All other implementations obtained by persons of ordinary skill in the art based on the implementations in this disclosure without making creative efforts fall within the scope of protection of this disclosure.

Furthermore, the drawings are merely schematic illustrations of the disclosure and are not necessarily drawn to scale. The same reference numerals in the drawings denote the same or similar parts, and thus repeated descriptions thereof will be omitted. Some of the block diagrams shown in the drawings are functional entities and do not necessarily correspond to physically or logically separate entities. These functional entities may be implemented in software, or in one or more hardware modules or integrated circuits, or in different network and/or processor apparatuses and/or microcontroller apparatuses.

The flowcharts shown in the drawings are illustrative only and do not necessarily include all steps. For example, some steps can be decomposed, and some steps can be combined or partly combined. Therefore, the actual execution sequence may be changed depending on the actual situations.

The terms used herein is for the purpose of describing particular implementations only and is not intended to be limiting of the disclosure. As used herein, the singular forms "a," "an," and "said/the" are intended to include the plural forms as well, unless the context clearly dictates otherwise. It should also be understood that the terms "consists of" and/or "comprising", when used in this specification, identify the existence of stated features, integers, steps, operations, elements and/or parts, but do not exclude the existence or addition of one or more other features, integers, steps, operations, elements, parts and/or groups. As used herein, the term "and/or" includes any and all combinations of the associated listed items.

In 3D NAND memory devices, a word line drive unit is usually arranged in the middle part of the storage area. Since the access paths between individual memory cells and the word line drive unit are different, the problem of signal loading delay may be caused. That is, the farther the distance of a memory cell from the word line drive unit is, the longer the access path between the memory cell and the word line drive unit is. Therefore, the word line signal of a far memory cell undergoes greater loading delay compared with that of the word line signal of a near memory cell in the programming process, which makes the programming process and programming time of memory cells at different positions difficult to be consistent.

Figure 1:
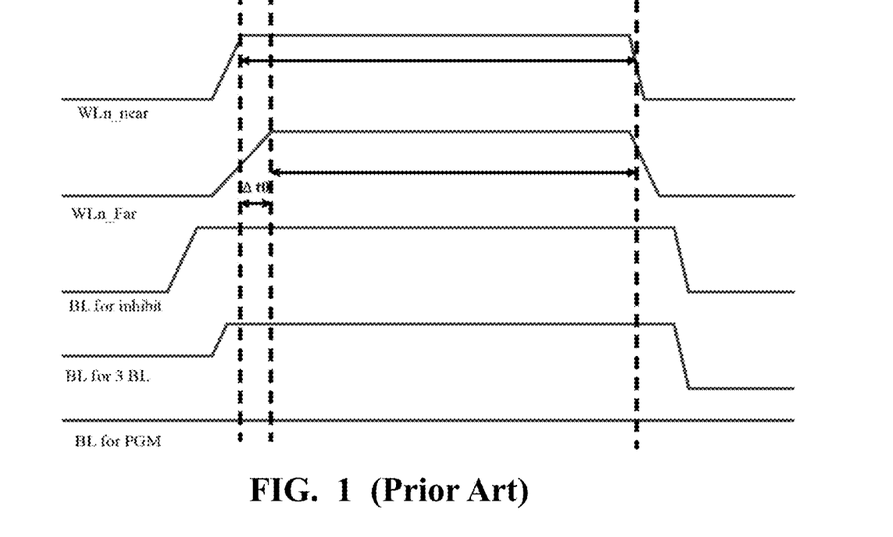
FIG. 1 is a schematic diagram of timing voltages of word lines and bit lines according to an implementation of the present disclosure.

Exemplarily, referring to FIG. 1, which illustrates a schematic diagram of timing voltages of word lines and bit lines, where the horizontal axis represents time, and the vertical axis represents voltage. WLn_near represents the word line that is closer to the word line drive unit, WLn_Far represents the word line that is farther away from the word line drive unit, BL for inhibit represents an inhibited bit line, BL for 3BL represents a bit line that corresponds to 3-bit-line (3BL) information, and BL for PGM represents a selected bit line. Since WLn_near is closer to the word line drive unit, the resistance of the word line is lower. Therefore, in the charging phase of programming, the voltage on WLn_near can reach a working voltage level faster than the voltage on WLn_Far. Since WLn_Far is farther away from the word line drive unit, the resistance of the word line is higher. In the charging phase of programming, the voltage on WLn_far takes more time to reach the working voltage level than the voltage on WLn_near. As shown in FIG. 1, the charge time difference between WLn_Far and WLn_near is Δt0.

Figure 2A:
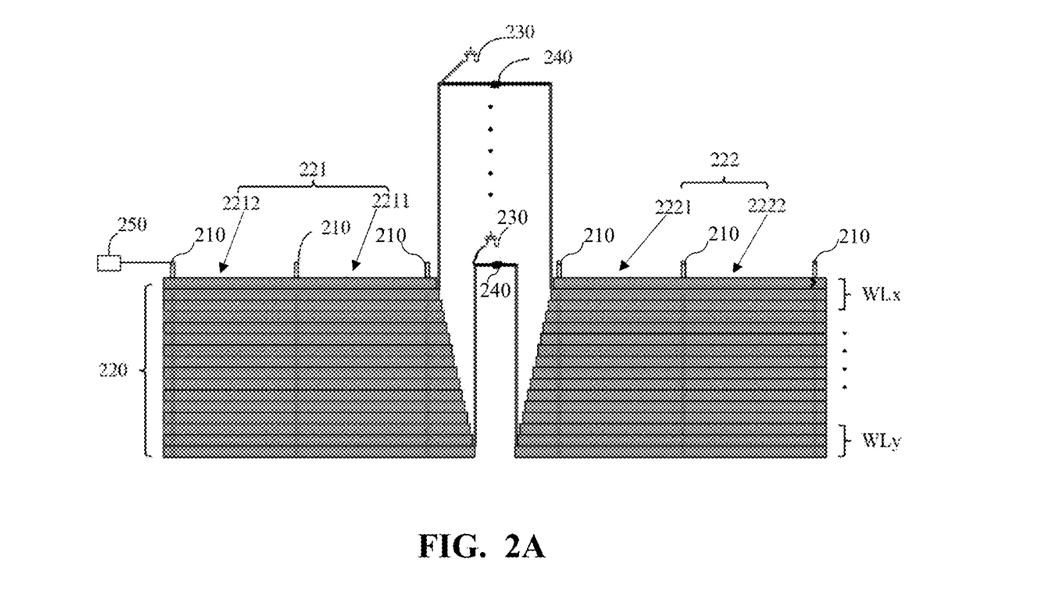
FIG. 2A is a schematic cross-sectional structural diagram of a semiconductor device according to an implementation of the present disclosure.
Figure 2B:
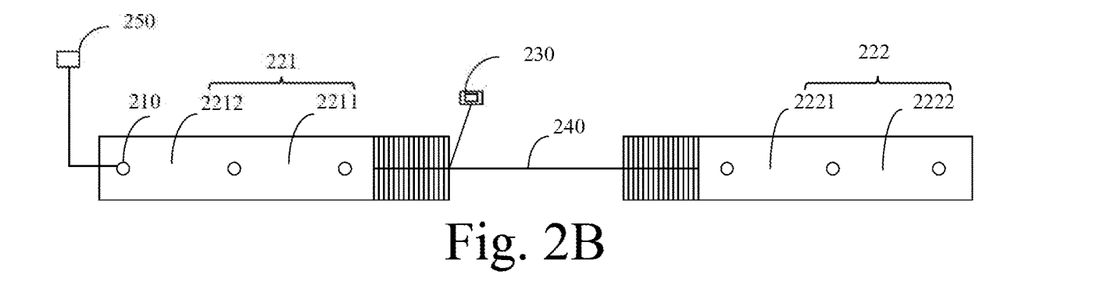
FIG. 2B is a schematic top view of a semiconductor device according to an implementation of the present disclosure.

In view of this, a semiconductor device is proposed in the present disclosure. Referring to FIG. 2A and FIG. 2B, FIG. 2A is a schematic cross-sectional structural diagram of a semiconductor device according to an implementation of the present disclosure, and FIG. 2B is a schematic top view of a semiconductor device according to an implementation of the present disclosure. The semiconductor device includes:
  a bit line unit 210, a word line unit 220, a bit line drive unit 250 and a word line drive unit 230; wherein,
  the bit line unit 210 is configured to divide the word line unit 220 into a first word line unit 221 and a second word line unit 222; the distance between the second word line unit 222 and the word line drive unit 230 is greater than the distance between the first word line unit 221 and the word line drive unit 230;
  the word line drive unit 230 is configured to provide driving voltages for programming to the word line units 220; and
  the bit line drive unit 250 is configured to apply a first bias voltage to the bit line unit that performs the dividing to obtain the first word line unit 221 in a charging phase of programming, and to apply a second bias voltage to the bit line unit that performs the dividing to obtain the second word line unit 222 in a discharging phase of programming.

In this implementation, the resistance on the word line is evenly distributed, that is, the value of the resistance of the word line is proportional to its length, where the word line drive unit 230 is located between the first word line unit 221 and the second word line unit 222, and it is closer to the first word line unit 221. A metal bridge 240 is provided between the word line drive unit 230 and the second word line unit 222, and the word line drive unit 230 is electrically connected to the second word line unit 222 via the metal bridge 240. Here, the value of the resistance of metal bridge 240 is smaller than each of the resistances of the first word line unit 221 and the second word line unit 222.

In an example, the word line drive unit 230 includes a plurality of word line drive subunits, and each of the plurality of word line drive subunits corresponds to a layer of word lines and is configured to provide a driving voltage for programming to the corresponding word line.

In this implementation, the word line unit 220 includes multiple layers of word lines, and the word line drive unit 230 is a collection of multiple word line drive subunits. The number of word line drive subunits is equal to the number of the layers of word lines. That is, the word line driving subunits are in one-to-one correspondence with the word lines, so that the independent driving of the individual layers of word lines by the multiple word line drive subunits is implemented.

It is noted that, in this implementation, since the resistance of the connecting wires between the various structures is extremely small compared with that of the word line unit 220 and the metal bridge 240, the length of the connecting wires is not limited. The term distance in the present disclosure refers to the length of the transmission path of the electrical signal. Here, one of the connection terminals is the word line drive unit 230, and the other connection terminal is the word line unit 220. The larger the distance between the two connection terminals, the longer the transmission path of the electrical signal between the two, and the greater the resistance of the path between the two.

In this implementation, the first word line unit 221 is directly connected to the word line drive unit 230 by means of a connecting wire, while the second word line unit 222 is connected to the word line drive unit 230 by means of a connecting wire and a metal bridge 240. The transmission path of the electrical signal between the second word line unit 222 and the word line drive unit 230 is longer, that is, the distance between the second word line unit 222 and the word line drive unit 230 is greater than the distance between the first word line unit 221 and the word line drive unit 230.

In this implementation, a bit line drive unit is provided to apply the first bias voltage to the bit line unit corresponding to the first word line unit in the charging phase, and apply the second bias voltage to the bit line unit corresponding to the second word line unit in the discharging phase, which reduces the programming time gap between the proximal word line subunit and the distal word line subunit.

In one implementation, the bit line unit 210 is further configured to divide the first word line unit 221 into a first word line subunit 2211 and a second word line subunit 2212. The distance between the second word line subunit 2212 and the word line drive unit 230 is greater than the distance between the first word line subunit 2211 and the word line drive unit 230.

The first word line unit 221 and the second word line unit 222 are respectively positioned on both sides of the word line drive unit 230, and the first word line subunit 2211 is a word line subunit of the first word line unit 221 closer to the word line drive unit 230. Here, the length of the first word line subunit 2211 is equal to the length of the second word line subunit 2212, so that the resistance R1 of the first word line subunit 2211 is equal to the resistance R2 of the second word line subunit 2212. However, the path resistance R2' between the second word line subunit 2212 and the word line drive unit 230 is different from the path resistance R1' between the first word line subunit 2211 and the word line drive unit 230. Since the path from the second word line subunit 2212 to the word line drive unit 230 is greater than the path from the first word line subunit 2211 to the word line drive unit 230 in length, and the path from the second word line subunit 2212 to the word line drive unit 230 includes the path from the first word line subunit 2211 to the word line drive unit 230, the path resistance R2' between the second word line subunit 2212 and the word line drive unit 230 is equal to the resistance R2 of the second word line subunit 2212 plus the resistor R1 of the first word line subunit 2211.

Exemplarily, assuming that the resistance R1 corresponding to the first word line subunit 2211 is 15KΩ, and the resistance R2 corresponding to the second word line subunit 2212 is 15KΩ, and ignoring the resistance of the wires between the word line drive unit 230 and the first word line subunit 2211 and the second word line subunits 2212, the path resistance R1' between the first word line subunit 2211 and the word line drive unit 230 is 15KΩ, and the path resistance R2' between the second word line subunit 2212 and the word line drive unit 230 is 30KΩ.

It is noted that, in this implementation, the word line subunits included in the first word line unit may not be limited to the first word line subunit and the second word line subunit, and may also be multiple word line subunits. The principle is similar to the above description, which will not be repeated here.

In one implementation, the bit line unit 210 is further configured to divide the second word line unit 222 into a third word line subunit 2221 and a fourth word line subunit 2222. The distance between the fourth word line subunit 2222 and the word line drive unit 230 is greater than the distance between the third word line subunit 2221 and the word line drive unit 230.

The third word line subunit 2221 is a word line unit of the second word line unit 222 closer to the word line drive unit 230. Here, the length of the third word line subunit 2221 is equal to the length of the fourth word line subunit 2222. Therefore, the resistance R3 of the third word line subunit 2221 is equal to the resistance R4 of the fourth word line subunit 2222. However, the path resistance R4' between the fourth word line subunit 2222 and the word line drive unit 230 is different from the path resistance R3' between the third word line subunit 2221 and the word line drive unit 230. Since the path from the fourth word line subunit 2222 to the word line drive unit 230 is greater than the path from the third word line subunit 2221 to the word line drive unit 230 in length, and the path from the fourth word line subunit 2222 to the word line drive unit 230 includes the path from the third word line subunit 2221 to the word line drive unit 230, the path resistance R4' between the fourth word line subunit 2222 and the word line drive unit 230 is equal to the resistance R4 of the fourth word line subunit 2222 plus the resistance R3 of the third word line subunit 2221 plus the resistance R5 of the metal bridge 240, and the path resistance R3' between the third word line subunit 2221 and the word line drive unit 230 is equal to the resistance R3 of the third word line subunit 2221 plus the resistor R5 of the metal bridge 240.

Exemplarily, assuming that the resistance R3 corresponding to the third word line subunit 2221 is 15KΩ, the resistance R4 corresponding to the fourth word line subunit 2222 is 15KΩ, and the resistance R5 of the metal bridge 240 is 10KΩ, and ignoring the resistance of the wire between the word line drive unit 230 and the third word line subunit 2221 and the fourth word line subunit 2222, the path resistance R3' between the third word line subunit 2221 and the word line drive unit 230 is 25KΩ, and the path resistance R4' between the fourth word line subunit 2222 and the word line drive unit 230 is 40KΩ.

It is noted that, in this implementation, the word line subunits included in the second word line unit may not be limited to the third word line subunit and the fourth word line subunit, and may also be multiple word line subunits. The principle is similar to the above description, which will not be repeated here.

In an implementation, the distance between the third word line subunit 2221 and the word line drive unit 230 is greater than the distance between the first word line subunit 2211 and the word line drive unit 230, and is less than the distance between the second word line subunit 2212 and the word line drive unit 230.

Further reference to FIG. 2, since the word line drive unit 230 is closer to the first word line unit 221, in ascending order, the path resistances between individual word line subunits and the word line drive unit 230 are: the path resistance R1' corresponding to the first word line subunit 2211, the path resistance R3' corresponding to the third word line subunit 2221, the path resistance R2' corresponding to the second word line subunit 2212, and the path resistance R4' corresponding to the fourth word line subunit 2222.

In this implementation, since the storage stack structure is a stepped structure, the lengths of the metal bridges 240 between the word lines of different layers are different, so that the resistance value of the metal bridges 240 between the word lines of different layers is varied, and its variation range is 1KΩ to 10KΩ. Due to the existence of the metal bridges 240, the path resistances between individual word line subunits and the word line drive unit 230 still satisfies the ordering of the path resistance R1' corresponding to the first word line subunit 2211, the path resistance R3' corresponding to the third word line subunit 2221, the path resistance R2 corresponding to the second word line subunit 2212 and the path resistance R4' corresponding to the fourth word line subunit 2222 in ascending order.

In an example, there are multiple metal bridges, and each metal bridge corresponds to a layer of word lines. Each word line drive subunit is electrically connected to the second word line unit via a corresponding metal bridge. With multiple word line drive subunits and multiple metal bridges, the independent driving of individual layers of word lines is achieved. Here, the metal bridge may be multiple metal wires with different resistances, such as tungsten wires.

In an implementation, the resistance R1 of the first word line subunit 2211, the resistance R2 of the second word line subunit 2212, the resistance R3 of the third word line subunit 2221, and the resistance R4 of the fourth word line subunit 2222 are equal. It should be noted that, since the lengths of the first word line subunit 2211, the second word line subunit 2212, the third word line subunit 2221, and the fourth word line subunit 2222 are equal, and thus R1, R2, R3, and R4 are equal. If the lengths of the first word line subunit 2211, the second word line subunit 2212, the third word line subunit 2221, and the fourth word line subunit 2222 are not equal, R1, R2, R3, and R4 are also not equal.

Here, the first word line subunit, the second word line subunit, the third word line subunit, and the fourth word line subunit are all word line subunits of the same specification, i.e., the word line unit is quarterly controlled. The only difference is that the distance (path) between each word line subunit and the word line drive unit is different, thus making the path resistance between each word line subunit and the word line drive unit different.

It is noted that, according to the actual programming performance requirements, the word line unit may also be controlled by eight equal divisions, sixteen equal divisions, thirty-two equal divisions, and the like. Here, the specific number of word line subunits is not limited.

In an implementation, the bit line drive unit is specifically configured to apply the first bias voltage $V_{int}$ to the bit line unit that performs the dividing to obtain the first word line subunit 2211, the second word line subunit 2212, and the third word line subunit 2221 in the charging phase of programming, and to apply the second bias voltage $V_{end}$ to the bit line unit that performs the dividing to obtain the fourth word line subunit 2222, the third word line subunit 2221, and the second word line subunit 2212 in the discharging phase of programming. Here, the first word line subunit 2211, the second word line subunit 2212, and the third word line subunit 2221 are proximal word line subunits closer to the word line drive unit, and the fourth word line subunit 2222, the third word line subunit 2221, and the second word line subunit 2212 are distal word line subunits farther away from the word line drive unit. The magnitudes of the first bias voltage $V_{int}$ and the second bias voltage $V_{end}$ may be equal or may be not equal, and no limitation is made thereto. It should be noted that, in this implementation, the bit line drive unit may also include multiple bit line drive subunits, and each bit line drive subunit is configured to apply a bias voltage to a different bit line during programming.

As described in the above implementations, the distance difference between each word line subunit and the word line drive unit results in the minimum path resistance between the first word line subunit and the word line drive unit, and the maximum path resistance between the fourth word line subunit and the word line drive unit. Therefore, when the working voltage is applied at the same time, the fourth word line subunit is the last to reach the working voltage, and according to this implementation, by applying the first bias voltage to the bit line unit corresponding to the first word line unit in the charging phase and by applying the second bias voltage to the bit line unit corresponding to the second word line unit in the discharging phase, the programming time gap between the proximal word line subunits and distal word line subunits is reduced. In this way, programming performance degradation due to the programming time deviation between the word lines during the storage operation is minimized, thereby improving the programming performance of the programming device.

Figure 3:
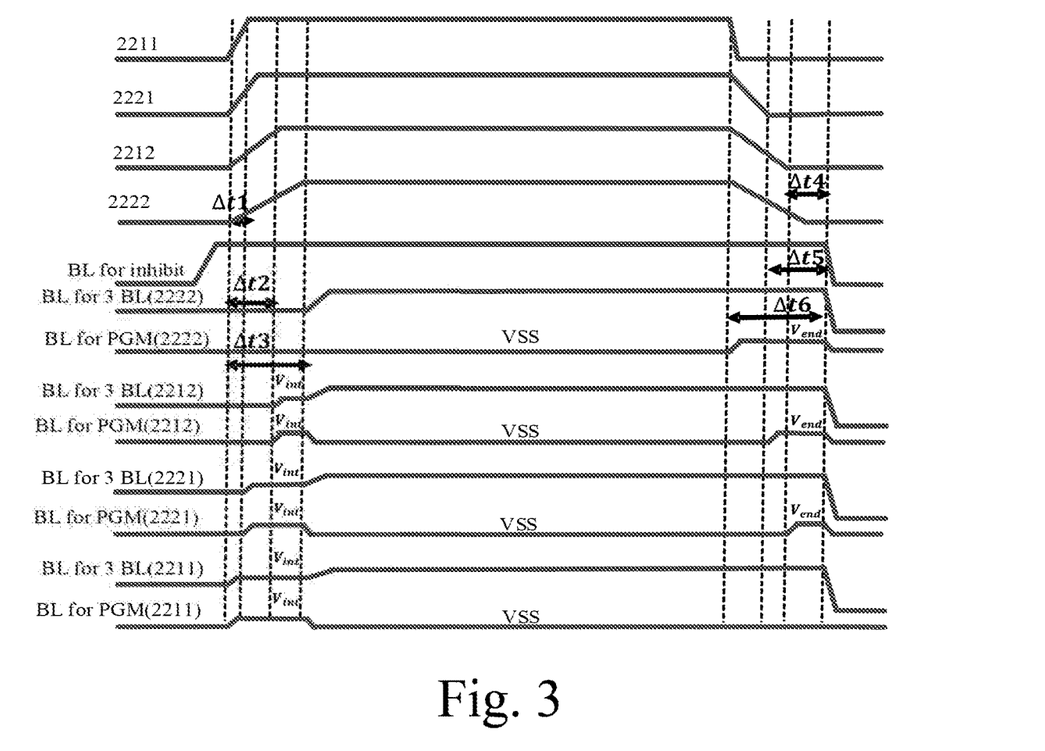
FIG. 3 is a schematic diagram of timing voltages of a word line and a bit line of a semiconductor device according to an implementation of the present disclosure.

Referring to FIG. 3, which is a schematic diagram of timing voltages of word lines and bit lines of a semiconductor device according to an implementation of the present disclosure, where each curve corresponds sequentially to the first word line unit 2211, the third word line unit 2221, the second word line unit 2212, the fourth word line unit 2222 from top to bottom, BL for inhibit represents an inhibited bit line unit, BL for 3BL (2222) represents a bit line unit corresponding to the fourth word line subunit 2222 to which a voltage between Vss and Vdd is to be applied, BL for PGM (2222) represents a bit line unit corresponding to the fourth word line subunit 2222 to which a voltage Vss is to be applied, BL for 3BL (2212) represents a bit line unit corresponding to the second word line subunit 2212 to which a voltage between Vss and Vdd is to be applied, BL for PGM (2212) represents a bit line unit corresponding to the second word line subunit 2212 to which a voltage Vss is to be applied, and BL for 3BL (2221) represents a bit line unit corresponding to the third word line subunit 2221 to which a voltage between Vss and Vdd is to be applied, BL for PGM (2221) represents a bit line unit corresponding to the third word line subunit 2221 to which a voltage Vss is to be applied, BL for 3BL (2211) represents a bit line unit corresponding to the first word line unit 2211 to which a voltage between Vss and Vdd is to be applied, and BL for PGM (2211) represents a bit line unit corresponding to the first word line unit 2211 to which a voltage Vss is to be applied.

In the charging phase of programming, the first bias voltage Vint is applied to bit line units that correspond to the first word line subunit 2211, the second word line subunit 2212 and the third word line subunit 2221 by the bit line drive unit, and an unselected voltage (such as Vdd) is applied to bit line units that do not correspond to the first word line subunit 2211, the second word line subunit 2212 and the third word line subunit 2221 by the bit line drive unit. Here, the first bias voltage Vint enables the voltages of the first word line unit 2211, the third word line unit 2221, and the second word line unit 2212 to be maintained at an intermediate voltage state respectively, and the charge time is increased to delay the time for each word line subunit to reach the working voltage. Accordingly, the programming times of the first word line unit 2211, the third word line unit 2221, the second word line unit 2212 are nearly synchronized with that of the fourth word line unit 2222. The first bias voltage Vint is higher than an initial voltage of each word line subunit, and lower than the working voltage. As shown in FIG. 3, the holding times of the intermediate voltage states of the first word line unit 2211, the third word line unit 2221 and the second word line unit 2212 are $\Delta t1$, $\Delta t2$, $\Delta t3$ respectively, where $\Delta t1 < \Delta t2 < \Delta t3$.

It should be noted that, in the charging phase of programming, the bit line units that correspond to the first word line subunit 2211, the second word line subunit 2212, and the third word line subunit 2221 may be referred to as selected bit lines, and the bit line units that do not correspond to the first word line subunit 2211, the second word line subunit 2212, and the third word line subunit 2221 may be referred to as unselected bit lines. Selected bit lines typically have a selected voltage (e.g., Vss) applied to them, and unselected bit lines typically have an unselected voltage (e.g., Vdd) applied to them. In the implementation of the present disclosure, the first bias voltage Vint is applied to the bit line units that correspond to the first word line subunit 2211, the second word line subunit 2212, and the third word line subunit 2221 to delay the time for the first word line subunit 2211, the second word line subunit 2212, and the third word line subunit 2221 to reach the working voltage, thereby reducing the effective programming time gap between the first word line subunit 2211, the second word line subunit 2212, the third word line subunit 2221, and the fourth word line subunit 2222.

In the discharging phase of programming, the second bias voltage $V_{end}$ is applied to the bit line units that correspond to the fourth word line subunit 2222, the third word line subunit 2221, and the second word line subunit 2212 by the bit line drive unit, and an unselected voltage (for example, Vdd) is applied to the bit line units that do not correspond to the fourth word line subunit 2222, the third word line subunit 2221, and the second word line subunit 2212 by the bit line drive unit. Here, the second bias voltage $V_{end}$ enables the discharge time of the fourth word line subunit 2222, the third word line subunit 2221, and the second word line subunit 2212 to be shortened, thereby ensuring the fourth word line subunit 2222, the third word line subunit 2221, and the second word line subunit 2212 to finish discharging almost simultaneously with the first word line unit 2211. As shown in FIG. 3, the intermediate voltage state holding times of the fourth word line subunit 2222, the second word line subunit 2212, and the third word line subunit 2221 are $\Delta t4$, $\Delta t5$, and $\Delta t6$, respectively, where $\Delta t4 < \Delta t5 < \Delta t6$.

It is noted that, in the discharging phase of programming, the bit line units that correspond to the fourth word line subunit 2222, the third word line subunit 2221, and the second word line subunit 2212 may be referred to as selected bit lines, and the bit line units that do not correspond to the fourth word line subunit 2222, the third word line subunit 2221, and the second word line subunit 2212 may be referred to as unselected bit lines. Selected bit lines typically have a selected voltage (e.g., Vss) applied to them, and unselected bit lines typically have an unselected voltage (e.g., Vdd) applied to them. In the implementation of the present disclosure, the first bias voltage Vint is applied to the bit line units that correspond to the fourth word line subunit 2222, the third word line subunit 2221, and the second word line subunit 2212, so as to shorten the discharge time of the fourth word line subunit 2222, the third word line subunit 2221, and the second word line subunit 2212, thereby reducing the effective programming time gap between the fourth word line subunit 2222, the third word line subunit 2221, and the second word line subunit 2212 and the first word line subunits 2211.

In the implementation of the present disclosure, by setting the bit line drive unit, the first bias voltage is applied to the bit line unit that performs the dividing to obtain the proximal word line subunits in the charging phase, and the second bias voltage is applied to the bit line unit that performs the dividing to obtain the distal word line subunits in the discharging phase, thereby delaying the time for the proximal word line subunits to reach the working voltage in the charging phase, and shortening the discharge time of the distal word line subunits in the discharging phase, so as to reduce the programming time gap between the proximal word line subunits and distal word line subunits.

In one implementation, the word line unit includes multiple word line unit groups, each word line unit group includes multiple layers of word lines, and the difference between the resistance values of any two layers of word lines in each word line unit group does not exceed a preset threshold. It should be noted that the word line units are divided based on the preset threshold, and the word lines whose resistance difference satisfies the preset threshold are grouped together, and then different word line unit groups are divided from top to bottom in sequence. The number of word line unit groups depends on the preset threshold and the number of layers of word lines.

Referring to FIG. 2A again, where the lengths of the word lines of different layers are different, resulting in different resistance values of the word lines of different layers. From top to bottom, the resistance values of the word lines gradually increase. The word lines whose difference of resistance values meet the preset threshold are grouped together, such as WLx and WLy in FIG. 2A, so that the resistance difference of the word lines in the same group is small. Then, in the subsequent programming process, the word line unit group is controlled per groups, thereby further reducing the programming time gap between the word line subunits in the word line unit group.

Here, the word line subunits are divided along the extending direction of the word lines, and the word line unit groups are divided along the extending direction of the bit lines. Therefore, the implementations of the present disclosure realize the division of the word line units in the vertical and horizontal dimensions, thereby reducing the programming time difference between the individual word line subunits to a great extent.

In an implementation, the bit line unit is configured to divide each word line unit group into a first word line group and a second word line group. The first word line groups in the multiple word line unit groups constitute the first word line unit and the second word line groups in the multiple word line unit groups constitute the second word line unit.

The bit line unit divides the word line unit horizontally, and is used to divide each word line unit group horizontally, so as to control the word line subunits in the vertical and horizontal dimensions, reducing the difference in resistance of word line unit in the vertical and horizontal dimensions. Therefore, the programming time gap between the word line subunits is greatly reduced.

In one implementation, the first bias voltage is positively correlated with the difference between the distance between the second word line unit and the word line drive unit and the distance between the first word line unit and the word line drive unit.

It can be understood that the greater the difference between the distance between the second word line unit and the word line drive unit and the distance between the first word line unit and the word line drive unit, the greater the difference in charge time between the two in the charging phase of programming. Therefore, the first bias voltage enables the difference in charge time between the second word line unit and the first word line unit to be reduced.

In one implementation, the second bias voltage is positively correlated with the difference between the distance between the second word line unit and the word line drive unit and the distance between the first word line unit and the word line drive unit.

Similarly, the greater the difference between the distance between the second word line unit and the word line drive unit and the distance between the first word line unit and the word line drive unit, the greater the difference in discharge time between the two in the discharging phase of programming. Therefore, the second bias voltage enables the difference in discharge time between the second word line unit and the first word line unit to be reduced.

Figure 4:
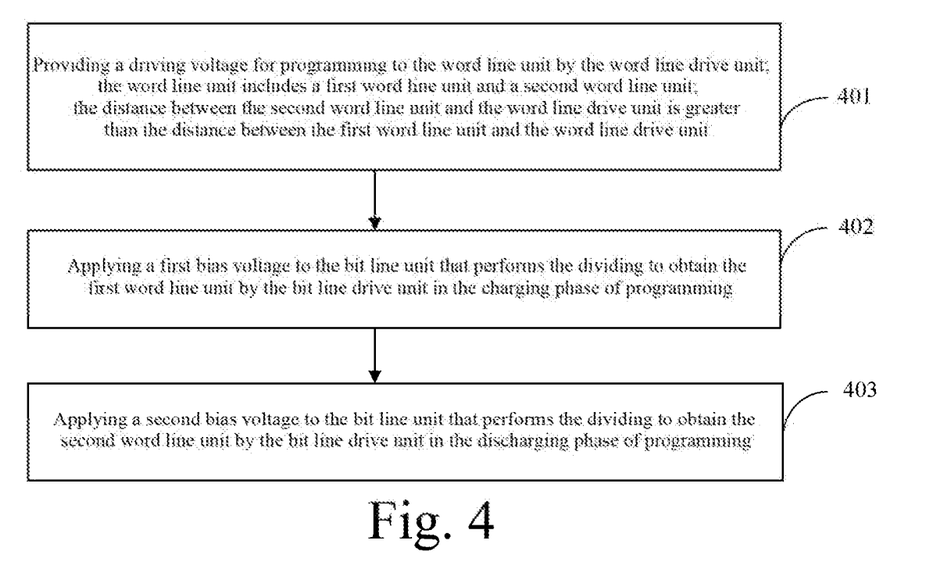
FIG. 4 is a schematic flow diagram of a programming method according to an implementation of the present disclosure.

A programming method is further provided according to the implementations of the present disclosure. Referring to FIG. 4, which is a schematic flowchart of a programming method according to the implementation of the present disclosure, and the programming method includes:

S401, providing a driving voltage for programming to the word line unit by the word line drive unit, where the word line unit includes a first word line unit and a second word line unit, the first word line unit and the second word line unit are divided by bit line units, and the distance between the second word line unit and the word line drive unit is greater than the distance between the first word line unit and the word line drive unit;

S402, applying a first bias voltage to the bit line unit that performs the dividing to obtain the first word line unit by the bit line drive unit in the charging phase of programming; and S403, applying a second bias voltage to the bit line unit that performs the dividing to obtain the second word line unit by the bit line drive unit in the discharging phase of programming.

In this implementation, the programming process as well as the driving voltage and the bias voltage can be controlled by a controller within the semiconductor device. Since the distance between the second word line unit and the word line drive unit is greater than the distance between the first word line unit and the word line drive unit, the path resistance between the second word line subunit and the word line drive unit is greater than the path resistance between the first word line subunit and the word line drive unit. Therefore, in the charging phase of programming, the first word line unit will reach the working voltage in a faster speed, and in the discharging phase of programming, the first word line will be discharged faster. Therefore, by setting the bit line drive unit, the first bias voltage is applied to the first bit line unit in the charging phase of programming, thereby suppressing the rise of the voltage of the proximal first word line unit in the charging phase, and prolonging the charge time, and the second bias voltage is applied to the second word line unit in the discharging phase of programming, shortening the discharge time, thereby reducing the difference in programming time of word lines at different positions to address the problem of the word line signal loading delay in a long distance. As a result, the programming performance degradation caused by the programming time deviation between the word lines during the storage operation is minimized, and the programming performance of the programming device is improved.

In one implementation, the first word line unit includes a first word line subunit and a second word line subunit, and the distance between the second word line subunit and the word line drive unit is greater than the distance between the first word line subunit and the word line driver unit.

The first word line unit and the second word line unit are respectively positioned on both sides of the word line drive unit, and the first word line subunit is a word line unit in the first word line unit closer to the word line drive unit. Here, the length of the first word line subunit and the length of the second word line subunit are equal, so that the resistance of the first word line subunit is equal to the resistance of the second word line subunit. However, the path resistance between the second word line subunit and the word line drive unit is different from the path resistance between the first word line subunit and the word line drive unit. Specific examples are described in the method implementations as described above, which will not be repeated here.

In one implementation, the second word line unit includes a third word line subunit and a fourth word line subunit, and the distance between the fourth word line subunit and the word line drive unit is greater than the distance between the third word line subunit and the word line driver unit.

The third word line subunit is a word line unit in the first word line unit closer to the word line drive unit. Here, the length of the third word line subunit is equal to the length of the fourth word line subunit, so that the resistance of the third word line subunit is equal to the resistance of the fourth word line subunit. However, the path resistance between the fourth word line subunit and the word line drive unit is different from the path resistance between the third word line subunit and the word line drive unit. Specific examples are described in the method implementations as described above, which will not be repeated here.

In one implementation, the distance between the third word line subunit and the word line drive unit is greater than the distance between the first word line subunit and the word line drive unit, and is less than the distance between the second word line subunit and the word line drive unit.

Exemplarily, in ascending order, the path resistance between individual word line subunits and the word line drive unit are: the path resistance corresponding to the first word line subunit, the path resistance corresponding to the third word line subunit, the path resistance corresponding to the second word line subunit, and the path resistance corresponding to the fourth word line subunit.

In an implementation, the first bias voltage is applied to the bit line unit that performs dividing to obtain the first word line subunit, the second word line subunit, and the third word line subunit by the bit line drive unit in the charging phase of programming. Here, the first word line subunit, the second word line subunit and the third word line subunit are proximal word line subunits that are closer to the word line drive unit.

Exemplarily, in the charging phase of programming, the first bias voltage is applied to the bit line unit that performs the dividing to obtain the first word line subunit, the second word line subunit, and the third word line subunit by the bit line drive unit. Here, the first bias voltage enables the voltages of the first word line unit, the third word line unit, and the second word line unit to be maintained at an intermediate voltage state respectively, increasing the charge time to delay the time for each word line subunit to reach the working voltage. Therefore, the programming times of the first word line unit, the third word line unit, and the second word line unit are nearly synchronized with the programming time of the fourth word line unit. The first bias voltage is higher than the initial voltages of the individual word line subunits, and is lower than the programmed working voltage.

In one implementation, the second bias voltage is applied to the bit line unit that performs the dividing to obtain the fourth word line subunit, the third word line subunit, and the second word line subunit by the bit line drive unit in the discharging phase of programming. Here, the fourth word line subunit, the third word line subunit, and the second word line subunit are distal word line subunits farther away from the word line drive unit.

In the discharge stage of programming, the second bias voltage is applied to the bit line unit that perform the dividing to obtain the fourth word line subunit, the third word line subunit, and the second word line subunit by the bit line drive unit. Here, the second bias voltage enables the discharge times of the fourth word line subunit, the third word line subunit, and the second word line subunit to be shortened, so that the discharge thereof can be completed simultaneously with that of the first word line unit, thereby reducing effective programming time gap between the fourth word line subunit, the third word line subunit, and the second word line subunit and the first word line subunit.

In the implementation of the present disclosure, by setting the bit line drive unit, the first bias voltage is applied to the bit line unit that performs the dividing to obtain the proximal word line subunits in the charging phase, and the second bias voltage is applied to the bit line unit that performs the dividing to obtain the distal word line subunits in the discharging phase, thereby delaying the time for the proximal word line subunit to reach the working voltage in the charging phase, and shortening the discharge time of the distal word line subunit in the discharging phase. As a result, the programming time gap between the proximal word line subunit and the distal word line subunit is reduced.

In one implementation, the word line drive unit includes multiple word line drive subunits, and each word line drive subunit corresponds to a layer of word lines. Providing a driving voltage for programming to the word line unit by the word line drive unit includes:

provides driving voltages for programming to the word lines of different layers based on a plurality of word line drive subunits.

Here, the word line drive unit is a collection of multiple word line drive subunits, and the number of word line drive subunits is equal to the number of layers of word lines, i.e., word line drive subunits correspond to word lines one by one. It should be noted that, in this implementation, the bit line drive unit may also include multiple bit line drive subunits, and each bit line drive subunit is used to apply a bias voltage to a different bit line during programming.

A memory including a memory unit and the above-mentioned semiconductor device is further provided according to an implementation of the present disclosure, and the semiconductor device is configured to control the memory unit to store data based on a command, an address, or a control signal received from the outside. Specific examples are described in the above examples of semiconductor devices, and will not be repeated here.

A memory system including a controller and the above-mentioned memory is further provided according to an implementation of the present disclosure. The controller is coupled to the memory, and is configured to control the memory to store data.

Figure 5A:
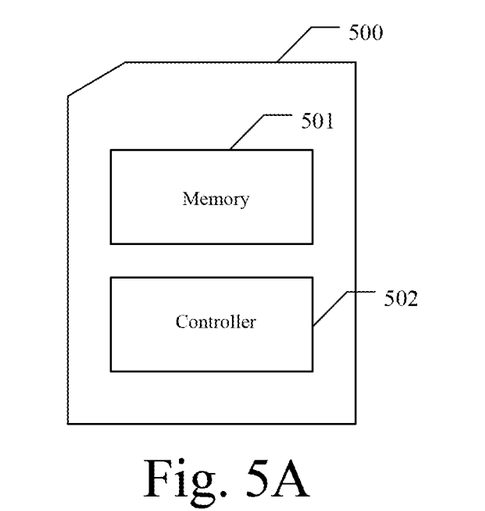
FIG. 5A is a first structural schematic diagram of a memory system according to an implementation of the present disclosure.

In an example, as shown in FIG. 5A, the memory system 500 may only include one memory 501 and one corresponding memory controller 502.

Figure 5B:
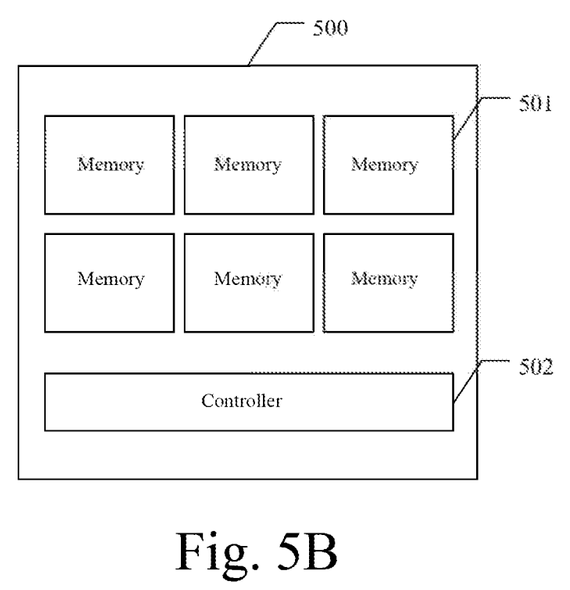
FIG. 5B is a second structural schematic diagram of a memory system according to an implementation of the present disclosure.

In another example, as shown in FIG. 5B, a memory system 500 may include multiple memories 501 and a corresponding memory controller 502.

Certainly, in some other examples, the memory system may also include multiple memories and corresponding multiple memory controllers, which are not enumerated.

In some implementations, the memory system may be implemented as a multimedia card such as a Universal Flash Storage (UFS) device, a Solid State Drive (SSD), MMC, eMMC, RS-MMC, and micro-MMC, Secure Digital Card such as SD, mini-SD, and micro-SD, a storage device such as Personal Computer Memory Card International Association (PCMCIA) card, a storage device such as Peripheral Component Interconnect (PCI), a storage device such as PCI-Express (PCI-E), Compact Flash (CF) card, smart media card or memory stick, and the like.

An electronic device including the above-mentioned memory is further provided according to an implementation of the present disclosure.

In an implementation, the electronic device includes at least one of the following: a mobile phone, a desktop computer, a tablet computer, a notebook computer, a server, a vehicle-mounted device, a wearable device, and a mobile power supply.

The methods disclosed in several method implementations provided in this disclosure can be combined arbitrarily without conflict to obtain new method implementations.

The features disclosed in several product implementations provided in this disclosure can be combined arbitrarily without conflict to obtain new product implementations.

The features disclosed in several method or device implementations provided in this disclosure can be combined arbitrarily without conflict to obtain new method implementations or device implementations.

In the several implementations provided in this disclosure, it should be understood that the disclosed methods and devices may be implemented in other ways. The device implementations described above are only illustrative. For example, the division of the modules is only a logical function division. In actual implementations, there may be other division methods. By way of example, multiple modules or components can be combined, or may be integrated into another system, or some features may be ignored, or not implemented. In addition, the coupling, or direct coupling, or communication connection between the components shown or discussed may be implemented via some interfaces, and the indirect coupling or communication connection of devices or modules may be electrical, mechanical or other forms.

The modules described above as separate components may or may not be physically separated, and the components displayed as modules may or may not be physical units, that is, they may be located in one place or distributed to multiple network modules. Part or all of the modules can be selected according to actual needs to achieve the purpose of the solution of this implementation.

In addition, each functional module in each implementation of the present disclosure can all be integrated into one processing module. Or, each module can be used individually as one module respectively, or two or more modules can be integrated into one module. The above-mentioned integrated modules can be implemented in the form of hardware, or in the form of hardware plus software function modules.

The forgoing descriptions are only specific implementations of the disclosure, and the scope of protection of the disclosure is not limited thereto. Any person skilled in the art can easily conceive of changes or substitutions within the technical scope disclosed in the disclosure, which should be covered within the protection scope of this disclosure. Therefore, the protection scope of the present disclosure should be determined by the protection scope of the claims.

What is claimed is:

1. A semiconductor device, comprising a plurality of bit line units, a word line unit, a bit line drive unit, and a word line drive unit, wherein,
    the word line unit comprises a plurality of word line layers that are stacked in a first direction,
    the word line unit comprises a first word line unit and a second word line unit in a second direction perpendicular to the first direction, a distance between the second word line unit and the word line drive unit being greater than a distance between the first word line unit and the word line drive unit,
    the word line drive unit is configured to provide the word line unit with a driving voltage for programming,
    the bit line drive unit is configured to apply a first bias voltage to a bit line unit of the plurality of bit line units that corresponds to the first word line unit during a charging phase of programming, and to apply a second bias voltage to a bit line unit of the plurality of bit line units that corresponds to the second word line unit during a discharging phase of programming,
    a value of the first bias voltage is determined to delay a time for the first word line unit to reach a working voltage during the charging phase of programming, and
    a value of the second bias voltage is determined to shorten a discharging time of the second word line unit during the discharging phase of programming.

2. The semiconductor device according to claim 1, wherein the plurality of bit line units are further configured to divide the first word line unit into a first word line subunit and a second word line subunit, and a distance between the second word line subunit and the word line drive unit is greater than a distance between the first word line subunit and the word line drive unit.

3. The semiconductor device according to claim 2, wherein the plurality of bit line units are further configured to divide the second word line unit into a third word line subunit and a fourth word line subunit, and a distance between the fourth word line subunit and the word line drive unit is greater than a distance between the third word line subunit and the word line drive unit.

4. The semiconductor device according to claim 3, wherein the distance between the third word line subunit and the word line drive unit is greater than the distance between the first word line subunit and the word line drive unit, and is less than the distance between the second word line subunit and the word line drive unit.

5. The semiconductor device according to claim 3, wherein resistances of the first word line subunit, the second word line subunit, the third word line subunit, and the fourth word line subunit are equal.

6. The semiconductor device according to claim 3, wherein the bit line drive unit is configured to apply the first bias voltage to bit line units of the plurality of bit line units that correspond to the first word line subunit, the second word line subunit, and the third word line subunit during the charging phase of programming, and to apply the second bias voltage to bit line units of the plurality of bit line units that correspond to the fourth word line subunit, the third word line subunit, and the second word line subunit during the discharging phase of programming.

7. The semiconductor device according to claim 1, wherein the word line unit comprises a plurality of word line unit groups in the first direction, each of the plurality of word line unit groups comprises a subset of the plurality of word line layers, and a difference between resistances of any two word line layers in each of the plurality of word line unit groups does not exceed a preset threshold.

8. The semiconductor device according to claim 7, wherein the plurality of bit line units are configured to divide each of the plurality of word line unit groups in the second direction into a first word line group and a second word line group, and
    the first word line groups of the plurality of word line unit groups constitute the first word line unit, and the second word line groups of the plurality of word line unit groups constitute the second word line unit.

9. The semiconductor device according to claim 1, wherein a magnitude of the first bias voltage is positively correlated with a difference between the distance from the second word line unit to the word line drive unit and the distance from the first word line unit to the word line drive unit.

10. The semiconductor device according to claim 1, wherein a magnitude of the second bias voltage is positively correlated with a difference between the distance from the second word line unit to the word line drive unit and the distance from the first word line unit to the word line drive unit.

11. The semiconductor device according to claim 1, wherein the word line drive unit comprises a plurality of word line drive subunits, and each of the plurality of word line drive subunits corresponds to one word line layer of the plurality of word line layers, and is used for providing the driving voltage for programming to the corresponding word line layer.

12. The semiconductor device according to claim 11, further comprising a plurality of metal bridges, each metal bridge corresponding to one word line layer of the plurality of word line layers;
    wherein each of the plurality of word line drive subunits is electrically connected to the second word line unit via a corresponding one of the plurality of metal bridges.

13. A memory, comprising a memory unit and a semiconductor device configured to control the memory unit for data storage based on a command, an address, or a control signal received from outside, wherein the semiconductor device comprises a plurality of bit line units, a word line unit, a bit line drive unit, and a word line drive unit;
    the word line unit comprises a plurality of word line layers that are stacked in a first direction;

the word line unit comprises a first word line unit and a second word line unit in a second direction perpendicular to the first direction, a distance between the second word line unit and the word line drive unit being greater than a distance between the first word line unit and the word line drive unit;

the word line drive unit is configured to provide the word line unit with a driving voltage for programming;

the bit line drive unit is configured to apply a first bias voltage to a bit line unit of the plurality of bit line units that corresponds to the first word line unit during a charging phase of programming, and to apply a second bias voltage to a bit line unit of the plurality of bit line units that corresponds to the second word line unit during a discharging phase of programming, a value of the first bias voltage is determined to delay a time for the first word line unit to reach a working voltage during the charging phase of programming; and a value of the second bias voltage is determined to shorten a discharging time of the second word line unit during the discharging phase of programming.

\* \* \* \* \*